F. R. EDWARDS.
GRAIN BIN.
APPLICATION FILED AUG. 20, 1920.

1,415,816.

Patented May 9, 1922.
2 SHEETS—SHEET 1.

Fig. 1.

WITNESSES
H. T. Walker
Robert J. Hulsizer

INVENTOR
FRANCIS R. EDWARDS
BY Munn & Co.
ATTORNEYS

F. R. EDWARDS.
GRAIN BIN.
APPLICATION FILED AUG. 20, 1920.
1,415,816.
Patented May 9, 1922.
2 SHEETS—SHEET 2.
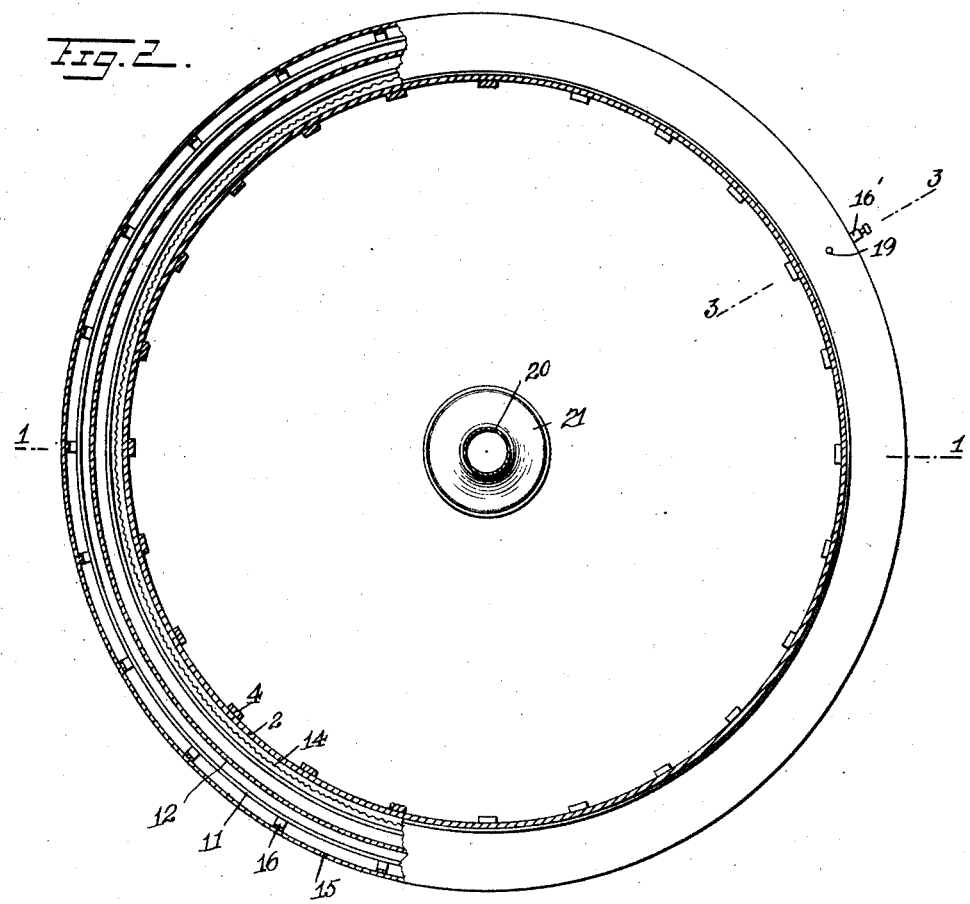
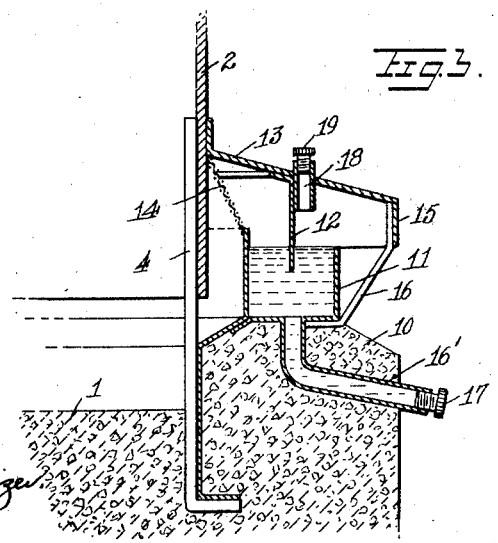
WITNESSES
H. T. Walker
Robert I. Hulsizer
INVENTOR
FRANCIS R. EDWARDS
BY Munn & Co.
ATTORNEYS

UNITED STATES PATENT OFFICE.

FRANCIS R. EDWARDS, OF JACKSONVILLE, FLORIDA.

GRAIN BIN.

1,415,816.   Specification of Letters Patent.   Patented May 9, 1922.

Application filed August 20, 1920. Serial No. 404,870.

*To all whom it may concern:*

Be it known that I, FRANCIS R. EDWARDS, a citizen of the United States, and a resident of Jacksonville, in the county of Duval and State of Florida, have invented a new and Improved Grain Bin, of which the following is a full, clear, and exact description.

This invention relates to bins for storing grain, and has particular reference to a bin in which the grain can be stored and most efficiently preserved.

An object of the invention is to provide a grain bin which is efficiently ventilated, into which insects cannot enter, and which can readily be closed off for the purpose of fumigation.

Another object is to provide a grain bin which is simple to construct, to operate, which requires few tools and very little experience on the part of the person setting it up, and which can be shipped readily in a "knocked-down" condition.

The invention in general comprises a grain bin of any suitable form, which is made of some material such as sheet metal, and which can be readily manufactured into forms adapting it for ready assemblage.

This bin is provided with ventilating openings in the top of the roof thereof, which roof is insectproof and which can be adjusted to close said openings tight whenever it is desired to fumigate the interior of the bin. Likewise, the bottom portion of the bin has a ventilating opening provided with means to prevent the entrance of insects into the bin and which has further arrangements whereby a liquid seal can be interposed into the ventilating passage to seal the same from the atmosphere, so that fumigant poured into a suitable receptacle in the upper part of the interior of the bin can most efficiently do its work.

The invention further comprises a ventilating shaft placed within the bin, which is made in suitable sections capable of ready assemblage in any number, and connected so as to provide openings throughout the length of the shaft for the passage of air therethrough.

The invention is illustrated in the drawings, of which—

Figure 1 represents a vertical section taken on the line 1—1 of Figure 2;

Figure 2 is a horizontal section taken on the line 2—2 of Figure 1; and

Figure 3 is a partial vertical section taken on the line 3—3 of Figure 2.

As shown in the drawings, the invention comprises a grain bin which is provided with any suitable solid base 1 which may be made of concrete, brick, or wood, as desired. The configuration of the base, and, consequently, the bin itself, may be of any desired form, either round or rectangular, depending upon the conditions under which it is to be used and the wishes of the builder. The side walls of the bin, as shown in the drawings, which represent one embodiment of the invention, are formed of sheet steel; and, in the form shown, are applied to a circular bin. In the figures, the side walls 2 of sheet metal are shown as extending substantially from the base 1 to the roof 3 in one section. Of course, it is understood that the side walls may be built up in a plurality of sections, as desired, depending upon the size of the bin to be built. These side walls are suitably fastened to angle frames 4 which are at their lower ends embedded in the concrete base. The roof 3, which is of similar material, has an upwardly projecting circular flange portion 5 forming part of a ventilating flue. The roof of the bin may be provided with one or more of the flange portions, as desired, depending upon the particular type of bin used. This flange portion is telescopically related to a cover portion 6 provided with suitable apertures 7 therein. Across the top of the flange portion 5, a screen or shield 8 of any desired material is placed, so that, although air and moisture may pass through, insects cannot enter the interior of the bin. By connecting the cover portion 6 with the flange portion 5 by such means as bolts 9, and providing the cover portion 6 with slots or other arrangements, the cover may be lowered with respect to the flange portion 5 so that the apertures 7 can be closed tight whenever it is desired to fumigate the interior of the bin.

The base 1 is provided around its edge, in conformation with the outline of the bottom of the bin, with a raised portion 10 on which is suitably fastened a trough 11. This trough 11 is made of any suitable material, but preferably of metal, and is built up of metallic sections, as shown in Figure 3, and is situated on the top of portion 10. A deflector plate 12 is disposed to extend partly into the trough 11 and is attached to a cover plate 13 which is fastened to the wall 2 of the bin. A screen or shield 14 extends from the top edge of one side of the trough and at the other end is fastened to the wall 2 of the bin adjacent the cover 13. The cover 13 is provided with a downwardly extending flange portion 15 which is supported at intervals throughout its length by a metal leg or upright 16 embedded in the portion 10 of the base 1. The trough is provided at its bottom with an outlet pipe 16′ having a suitable plug 17. The cover plate 13 is provided with an inlet pipe 18 and a suitable plug 19 therefor.

It is within the spirit of my invention that this trough and the co-operating parts just described may extend entirely around the bin or may extend only partly around the same, the particular arrangement being a matter largely resident in the desires of the person building the bin. It will be readily seen that by reason of the projection of the baffle plate 12 into the trough, whenever liquid is put into the trough the passage of air or insects into the interior of the bin is prevented. The lower edges of the side walls 2 of the bin are supported by the angle frames 4 a little distance above the portion 10 of the base 1 adjacent the trough. When the water or liquid is withdrawn from the trough 11, air can enter around the baffle plate and through the screen or shield 14, but insects cannot enter.

For the ventilation of the grain in the bin at the middle portion thereof, I provide a ventilating pipe which is made of a plurality of sections 20 of pipe of any suitable material. Each section is provided at one end with an enlarged, funnel-shaped portion 21, the other end being of a normal diameter. Each section is disposed with relation to another section with the enlarged end adjacent the normal end of the other section, and the sections are connected together by means of a metallic spider or web frame 22. The particular means for fastening the web frame to the sections is not part of the invention and any suitable means may be provided. The web frame is adapted to connect with the enlarged portion 21 of each section by being provided with grooves or slots 23 into which the edges of these portions fit. A suitable stand 24, of any form, is provided for the lower end of the bottom section. These sections may be built one upon another to any desired height and may be disposed in any number and in any position throughout the interior of the bin. By reason of the placement of the large end of one section adjacent the normal end of another section, openings are provided through which air may pass upward through the bin to ventilate the grain.

The roof 3 of the bin is provided with a suitable door of a size sufficient to permit a person entering therethrough. Adjacent the door, in the edge of the roof portion, an inlet pipe 25′, which is similar to the inlet pipe 18 shown and described in connection with the liquid seal for the lower part of the bin, is provided and leads to a fumigating trough 25 which is disposed around the upper inner edge of the walls 2 near the roof 3. This trough may extend entirely or only partly around the walls, and is adapted to contain fumigating liquid. That portion of the trough which is adjacent the door 26 is covered over, as shown at 27, to protect the fumigating liquid and the trough from any material which may pass through the door. At the same time, by placing the inlet pipe into the trough near the door, this arrangement, whereby the trough is covered, prevents the fumigating liquid from flashing out of the trough into the interior of the bin. In the side walls of the bin I provide another door 28 which is adapted to slide snugly in guide frames 29 and is provided with a groove 30 at its lower end which engages with the edge portion 31 of the side walls.

It is to be understood that the various parts of the bin described are made so that their union and engagement will be tight and that when they are closed, for the purpose of fumigating the contents of the bin, the fumigation will be efficiently carried on. It is a simple matter to introduce into and remove liquid from the trough 11 so that a liquid seal can simply be made, and requires little attention and operation on the part of the person running the bin.

This matter of providing a simple, economically constructed, and readily operated bin for grain is a very important feature in the lives of farmers, as sometimes a large percentage of the grain stored is destroyed by reason of molds, rots, sweating, fermentation and vermin. It is especially adaptable by reason of the fact that it can be made and shipped to the purchaser in a form ready for assemblage, involving very little labor and requiring very little experience.

The position of the fumigant trough within the bin is not necessarily confined to the position shown in the drawings, but this position is particularly adaptable for use with fumigants the fumes of which are heavier than air. The use of other fumigants may make it desirable to place the trough in another position.

It is to be understood that although I refer to the use of this device as a grain bin, it is, without departing from the spirit of the invention, equally and as efficiently adaptable for use as a bin to store a large variety of materials, such as roots, bulbs, nursery trees, and any other agricultural materials which it is desired to store in a well ventilated, insectproof bin adaptable when necessary for efficient fumigation.

I claim:

1. A bin having ventilating openings at the top and bottom thereof, insect shields in both of said openings, a liquid trough co-operating with the lower opening, means for closing the lower opening, and means for closing the upper opening when the contents of the bin are to be fumigated.

2. A bin having a ventilating passage therein, a liquid trough in said passage, and means co-operating with said trough to seal said passage when liquid is introduced into the trough.

3. A bin having a ventilating passage therein, a liquid trough in said passage, an insect shield in said passage, and means co-operating with said trough to seal the passage when liquid is introduced into the trough.

4. A bin having a ventilating passage therein, an insect shield in said passage, a liquid trough in said passage, a baffle plate extending into said trough, and means for introducing liquid into said trough to seal said passage.

5. A bin having ventilating openings at the top and bottom thereof, a liquid trough co-operating with the bottom openings, a ventilator shaft within the bin having openings throughout its length, means for closing the top openings, and means for closing the bottom openings when the contents of the bin are to be fumigated.

6. A bin having ventilating openings at the top and bottom thereof, a ventilator shaft within the bin having openings throughout its length, insect shields in the top and bottom openings, a liquid trough co-operating with the bottom openings, means for closing the top openings, and means for closing the bottom openings when the contents of the bin are to be fumigated.

7. A bin having a roof, a ventilating casing, having openings, telescopically engaging a portion of the roof, insect shields disposed between said openings and the interior of the bin, means to telescopically lower the casing on to the roof portion to close the openings during fumigation of the contents of the bin, the lower portion of said bin having a ventilating passage, a liquid trough in said passage, a baffle plate extending into said trough, means for introducing liquid into said trough to seal said passage, a ventilator shaft within said bin, said shaft composed of a plurality of open-ended pipe sections placed one on another, one end of each section being enlarged to provide ventilating openings, and pipe stands connecting the sections and supporting the same.

8. A bin having walls, a fumigant trough formed along the walls of the bin, and means by which fumigant may be introduced into said trough from without the bin.

9. A bin having walls and a roof, a fumigant trough along the walls within the bin beneath the roof, a door in the roof, and a shield over said trough where the trough lies adjacent said door.

10. A bin having walls and a roof, a fumigant trough within the bin along the walls beneath the roof thereof, a door in the roof, a shield over said trough where it lies adjacent said door, and an inlet pipe into said trough from without the bin and adjacent the door.

11. A bin having walls and ventilating openings at the top and bottom thereof, a fumigant trough formed along the walls within the bin, means by which fumigant may be introduced from without into the trough, means for closing the top openings, and means for closing the bottom openings when the contents of the bin are to be fumigated.

FRANCIS R. EDWARDS.